Dec. 28, 1937.  A. C. JOHNSON  2,103,370
HAY FORK
Filed Feb. 19, 1936    2 Sheets-Sheet 1
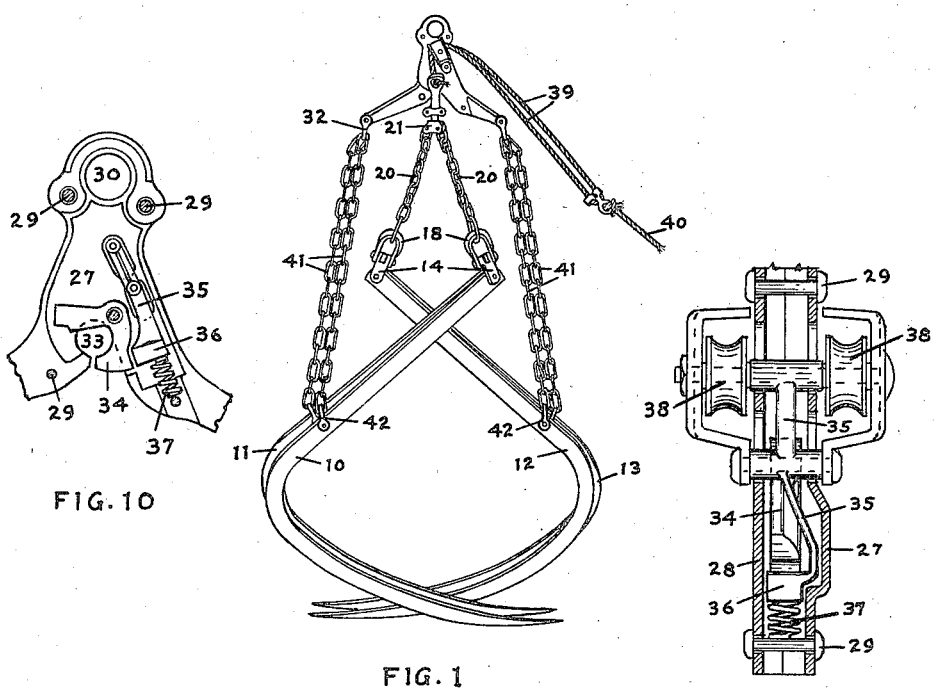
FIG. 1
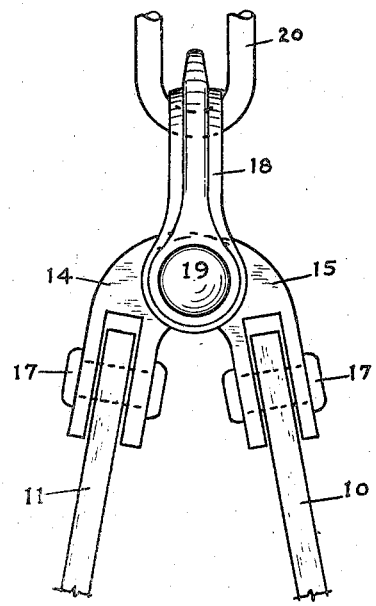
FIG. 10
FIG. 9
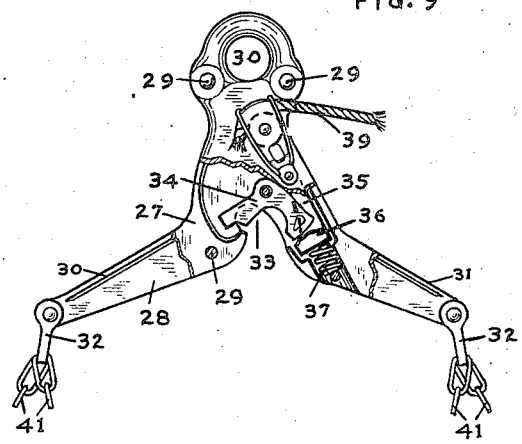
FIG. 5
FIG. 6
Albert C. Johnson
INVENTOR Dec. 28, 1937.  A. C. JOHNSON  2,103,370
HAY FORK
Filed Feb. 19, 1936  2 Sheets-Sheet 2
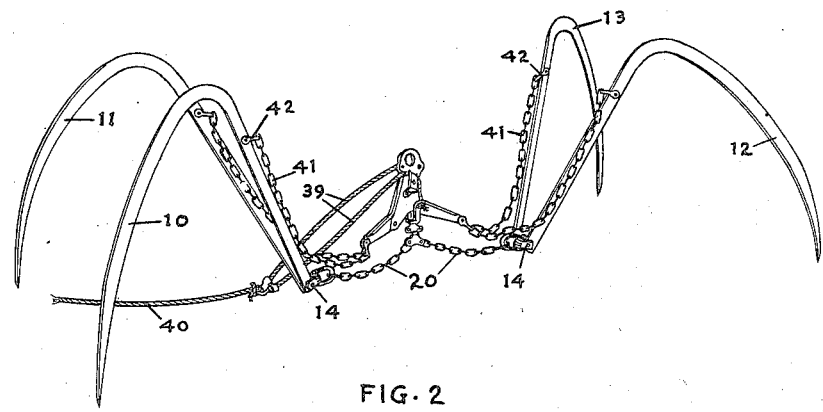
FIG. 2
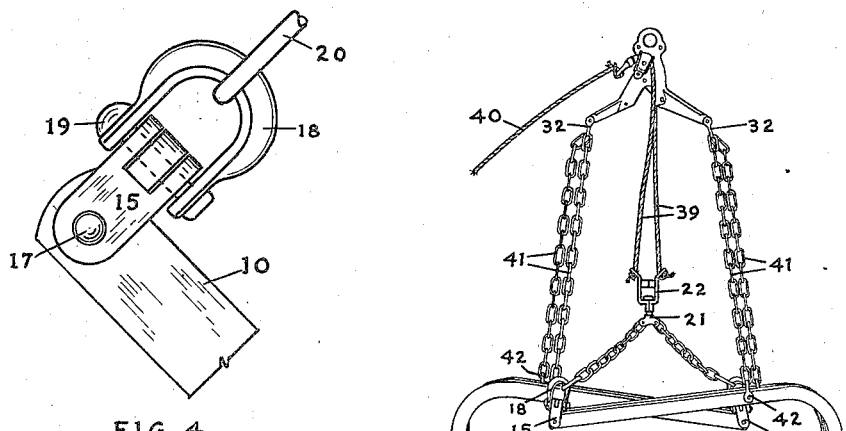
FIG. 4
FIG. 3
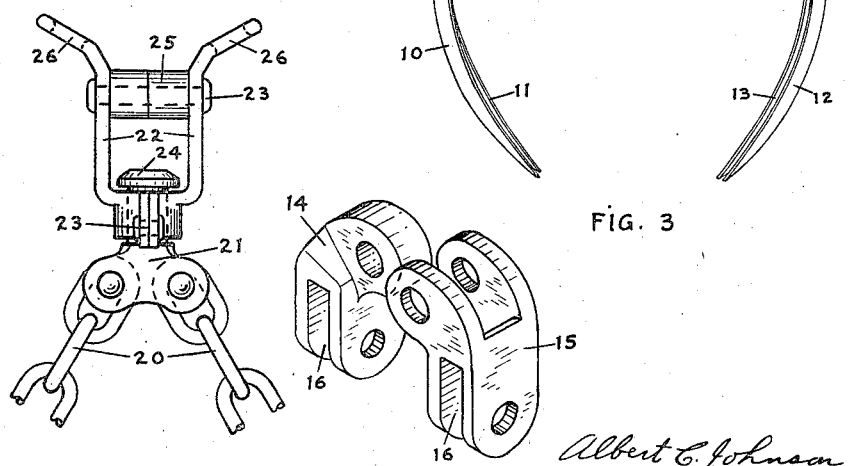
FIG. 7  FIG. 8
Albert C. Johnson
INVENTOR Patented Dec. 28, 1937

2,103,370

UNITED STATES PATENT OFFICE 2,103,370

HAY FORK

Albert C. Johnson, Fairfield, Iowa, assignor to The Louden Machinery Company, Fairfield, Iowa, a corporation of Iowa Application February 19, 1936, Serial No. 64,718

11 Claims. (Cl. 294—109)

My invention relates to improvements in hay forks and has particular relation to that type of fork used for conveying hay from the load into the barn. The tines of the fork are placed in the hay on the load and the fork is then raised by means of tackle to a carrier which moves along a trackway into the barn where the fork is tripped and the hay is released and falls in the hay mow.

The objects of the invention are to provide a fork wherein the ends of the fork tines will be drawn in toward the center of the load as the load is raised, thereby binding the hay together; to provide a fork, the tines of which may be placed in any position in the hay from horizontal to perpendicular so that the size of the load may be regulated; to provide a fork wherein the tines can be placed directly toward the center of the load without being deflected, and to provide a fork wherein the tines can be returned to the load in pairs so that two tines can be easily handled at a time and set in position.

Further objects and advantages of the invention will appear from a consideration of the following description in conjunction with the accompanying drawings in which—

Fig. 1 is a front view of the fork in the position when suspended without a load.

Fig. 2 is a perspective view of the work in the position before the fork tines are inserted in the load.

Fig. 3 is a front view in the position after the hay has been released.

Figs. 4 and 5 are detailed views of the tine connection which will be referred to herein.

Fig. 6 is a front view of the fork head, a portion of the same being broken away.

Fig. 7 is a detailed view of the connecting yoke.

Fig. 8 is a perspective of the hinge connection detached and

Figs. 9 and 10 are detailed views of the latch mechanism.

Referring to the drawings, these show four fork tines 10, 11, 12 and 13 arranged in pairs, each pair being connected by means of a hinge composed of members 14 and 15. Each of the hinge members is provided with a slotted opening 16 in the lower part of the member and the end of a tine is hinged in each opening by means of a rivet 17. Fig. 5 is a side view and Fig. 4 is a front view showing this connection. A clevis 18 is attached to the hinge members 14 and 15 by means of a rivet 19, and one end of a chain 20 is secured to the clevis and the opposite end to a swivel 21, which is carried by a yoke 22. Each pair of tines is connected to the swivel in the manner recited and is individually supported therefrom.

The yoke 22 is preferably made of two castings secured together by means of rivets 23 and each casting is recessed in the lower part, which forms an opening when the castings are fastened together. The swivel 21 is placed in the opening and the swivel head 24 thereof is seated on that part of the castings surrounding the upper part of the opening. A spacing member 25 is placed on the rivet 23 in the upper part of the yoke and it is adapted to register with a latch member in the fork head, as will be later referred to. The ends of the yoke are flared outwardly and each end is provided with an eye 26.

The yoke cooperates with a fork head by means of which the tines are operated. The hoisting mechanism, or tackle, is not shown in the drawings as it is in general use and is well known in the art. Any suitable type of a fork head may be used with my invention and I employ a head, as is shown in Fig. 6. The head is composed of two castings 27 and 28 fastened together with rivets 29 and an opening 30 is formed in the upper portion thereof, through which a hook connected to the hoisting tackle may be inserted, the hook and tackle not being shown. The fork head is provided with two arms 30 and 31 and at the end of each a suspension member 32 is riveted. The central section of the casting 27 is extended outwardly to accommodate the latching mechanism, and a recess 33 is provided in the lower part thereof to receive the member 25 on the yoke. Fig. 9 is a side view of the latching mechanism viewing it from the right side of Fig. 6, and Fig. 10 is a sectional view of the same, the casting 28 being removed.

A bifurcated latch 34 is pivotally mounted between the castings 27 and 28, which, when in locked position, engages the spacing member 25 and thereby holds the yoke 22 in engagement with the fork head, and when the latch is released, permits the yoke to become disengaged from the latch. The latch is controlled by means of a trip member 35 slidably mounted in the castings 27 and 28 and a block 36 is carried on the lower end thereof. A coiled spring 37 bears against the bottom of the block 36 and when the latch is in locked position tends to force the trip member upwardly so that the block will engage the latch 34 and hold it in locked position, as is shown in Fig. 10.

The upper part of the trip 35 has secured thereon two pulleys 38 (Fig. 9) over which trip ropes 39 are passed, one end of the ropes being secured in the eyes 26 on the rope 22 and the opposite ends to a single rope 40. With this construction the yoke 22 can be drawn by the trip ropes to the fork head and the spacing member will bear against one branch of the latch, causing the latch to pivot away from the trip member and permit the spacing member to register in the recess 33. As the latch is moved away from the trip 35, the spring 37 forces the trip member and the block 36 upwardly, so that the block will engage the side of one of the branches of the latch 34 and hold it in locked position as is shown in Fig. 10. To release the latch, the trip rope 40 is pulled, which forces the trip member and block 36 downwardly and when the block has cleared the side of the branch of the latch, the weight of the yoke will cause the latch to pivot toward the trip member, thereby releasing the yoke from the latch.

Each tine is provided with a dumping chain 41, which is connected at one end to a clevis 42, fastened on the tine intermediate the ends thereof and at the opposite end to the suspension member 32. When the load is to be discharged, the yoke is released from the head and the weight of the load will cause the tines to assume the position shown in Fig. 3, so that the load will slide off from the tines.

In use, the fork tines are lowered onto the load in the position shown in Fig. 1, wherein the tines lie flat together in pairs. As the tines contact the load, they are usually placed in position shown in Fig. 2 of the drawings. The tines being hinged together and also hinged to the hinge members permits the operator to insert the tines in each pair into the load, either together or singly and from horizontal position to vertical position, according to the load the operator desires to move. This construction permits the operator to set the tines in the load in a variety of positions and in this manner the size of the load can be regulated which is not possible with the so-called grapple forks wherein several tines are rigidly secured together. Moreover, the tines are hingedly connected and each tine when inserted in the load will move toward the center of the same and cannot be diverted from its course, thereby better insuring the load being held as it is moved. When a loose tine fork is used, the tine is inserted in the hay and quite frequently the pointed end is deflected away from the course toward the center of the load and as the load is raised, there is no control over the pointed end. With my invention, as the load is raised, the pull exerted on the hinged member tends to draw the tines together and to move the pointed ends of the tines in toward the center of the load, binding the load so that it cannot fall away from the tines until they are released. The load is then conveyed to the place where it is to be dumped and the trip rope is pulled, disengaging the yoke from the fork head and thereby discharging the load as has been herein explained, the tines being in the position shown in Fig. 3. The yoke is then connected with the fork head by pulling the trip rope and the fork is then returned for another load. It will be readily apparent to those familiar with the art that an operator standing on the load can easily and quickly set the tines in the load without resorting to the effort required when a number of tines are rigidly joined together.

Modifications will be apparent to those skilled in the art and it is desired, therefore, that the invention be limited only to the prior art and the scope of the appended claims.

Having described my invention, what I claim and desire to secure by Letters Patent is:

1. A hay fork comprising a head, a plurality of individually supported pairs of tines, the tines of each pair being hinged with respect to each other, and constrained to move about a definite axis, means connecting the hinged ends of the tines to the head, said means being releasably secured to the head, and means connecting the tines intermediate their length to the head to support the tines when the first mentioned means are released from the head.

2. A hay fork comprising a head, a plurality of individually supported pairs of tines, a hinge member connecting the tines in each pair, said tines being hinged to the hinge member, means connecting the hinge member to the head, said means being releasably secured to the head and means connecting the tines intermediate their length to the head to support the tines when the first mentioned means are released from the head, each of said hinge members comprising a pair of hinged portions pivoted together and constrained in their movement with respect to each other to move about a definite axis.

3. A hay fork comprising a head, a plurality of individually supported pairs of tines, a hinge member connecting the tines in each pair, one at least of said tines being hinged to the hinge member, means connecting the hinge member to the head, said means being releasably secured to the head and means connecting the tines intermediate their length to the head to support the tines when the first mentioned means are released from the head, each of said hinge members comprising a pair of hinged portions pivoted together and constrained in their movement with respect to each other to move about a definite axis.

4. A hay fork comprising a head having a latch therein, a plurality of individually supported pairs of tines, the tines of each pair being hinged with respect to each other, and constrained to move about a definite axis, chains secured at one end to the hinged ends of the tines and releasably secured to said latch at the opposite end, and chains connecting the tines intermediate their length to the head to support the tines when the first mentioned chains are released from the latch.

5. A hay fork comprising a head having a latch therein, a plurality of individually supported pairs of tines, a hinge member connecting the tines in each pair, said tines being hinged to the hinge member, chains secured at one end to the hinge ends of the tines and releasably secured to said latch at the opposite end and chains connecting the tines intermediate their length to the head to support the tines when the first mentioned chains are released from the latch each of said hinge members comprising a pair of hinged portions pivoted together and constrained in their movement with respect to each other to move about a definite axis.

6. A hay fork comprising a head having a latch therein, a plurality of individually supported pairs of tines, a hinge member connecting the tines in each pair, one at least of said tines being hinged to the hinge member, chains secured at one end of the hinged ends of the tines and releasably secured to said latch at the opposite end and chains connecting the tines intermediate their length to the head to support the tines when the first mentioned chains are released from the latch each of said hinge members comprising a pair of hinged portions pivoted together and constrained in their movement with respect to each other to move about a definite axis.

7. A hay fork comprising a head having a latch therein, a plurality of individually supported pairs of tines, the tines of each pair being hinged with respect to each other, and constrained to move about a definite axis, a yoke, a chain connecting each pair of tines to the yoke, said yoke cooperating with the latch and adapted to engage with and be released therefrom and chains connecting the tines intermediate their length to the head to support the tines when the yoke is released from the latch.

8. A hay fork comprising a head having a latch therein, a plurality of individually supported pairs of tines, a hinge member connecting the tines in each pair, said tines being hinged to the hinge member, a yoke, a chain connecting each pair of tines to the yoke, said yoke cooperating with the latch and adapted to engage with and be released therefrom and chains connecting the tines intermediate their length to the head to support the tines when the yoke is released from the latch, each of said hinge members comprising a pair of hinged portions pivoted together and constrained in their movement with respect to each other to move about a definite axis.

9. A hay fork comprising a head having a latch therein, a plurality of individually supported pairs of tines, a hinge member connecting the tines in each pair, one at least of said tines being hinged to the hinge member, a yoke, a chain connecting each pair of tines to the yoke, said yoke co-operating with the latch and adapted to engage with and be released therefrom and chains connecting the tines intermediate their length to the head to support the tines when the yoke is released from the latch, each of said hinge members comprising a pair of hinged portions pivoted together and constrained in their movement with respect to each other to move about a definite axis.

10. A hay fork comprising a head, a plurality of individually supported groups of tines, the tines of each group being hinged with respect to each other and constrained to move about a definite axis, means connecting the hinged ends of the tines to the head, said means being releasably secured to the head, and means connecting the tines intermediate their length to the head to support the tines when the first mentioned means are released from the head.

11. A hay fork comprising a head, a plurality of groups of tines, means hingedly connecting at least one tine of each group with another tine of this group, suspension members secured at their ends to the hinged ends of the tines and releasably secured to the head, and suspension means connecting the tines intermediate their lengths to the head to support the tines when the releasable suspension members are released, each of said hinges comprising a pair of hinge portions pivoted together and constrained in their movement with respect to each other to move about a definite axis.

ALBERT C. JOHNSON.